United States Patent [19]

Jerman et al.

[11] Patent Number: 5,126,409
[45] Date of Patent: Jun. 30, 1992

[54] POLYGLUTARIMIDES WITH IMPROVED PROPERTIES

[75] Inventors: Robert E. Jerman, Southampton, Pa.; William T. Freed, Stockton, N.J.; Leslie A. Cohen, Langhorne; Lucinda F. Buhse, North Wales, both of Pa.; Glenn W. Miller, Cherry Hill, N.J.

[73] Assignee: Rohm and Haas Company, Philadelphia, Pa.

[21] Appl. No.: 638,586

[22] Filed: Jan. 8, 1991

[51] Int. Cl.$^5$ .......................... C08F 8/30; C08F 8/32
[52] U.S. Cl. ........................... 525/329.9; 525/327.4; 525/327.6; 525/327.7; 525/329.5; 525/329.6; 525/329.8; 525/330.1; 525/330.4; 525/330.5; 525/330.6; 525/343; 525/348; 525/379; 525/383; 525/384; 525/385; 525/386
[58] Field of Search .................... 525/379, 329.9, 383, 525/343

[56] References Cited

U.S. PATENT DOCUMENTS

| | | | |
|---|---|---|---|
| 4,246,374 | 1/1981 | Kopchik | 525/379 |
| 4,727,117 | 2/1988 | Hallden-Abberton et al. | 525/343 |
| 4,745,159 | 5/1988 | Anzai et al. | 525/329.9 |

FOREIGN PATENT DOCUMENTS 376748  7/1990  European Pat. Off. .

*Primary Examiner*—Joseph L. Schofer
*Assistant Examiner*—Fred Zitomer
*Attorney, Agent, or Firm*—Roger K. Graham

[57] ABSTRACT

Polyglutarimides exhibit improved optical properties, as well as lowered content of non-aqueous volatiles, when the molten polyglutarimide is mixed with water, methanol, ethanol, or mixtures thereof, and the water, methanol, ethanol, or mixtures thereof is removed prior to isolation and processing of the polyglutarimide.

8 Claims, No Drawings

POLYGLUTARIMIDES WITH IMPROVED PROPERTIES

FIELD OF THE INVENTION

This invention relates to a process for improving the optical properties, such as color and transparency, of polymers containing at least about 30 weight percent of glutarimide units having the

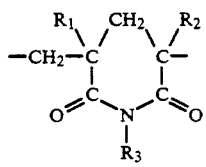

wherein $R_1$ and $R_2$ are separately H or $CH_3$, and $R_3$ is H, $C_1$-$C_{20}$ alkyl, substituted $C_1$-$C_{20}$ alkyl, cycloalkyl, aryl, substituted aryl, aralkyl, substituted aralkyl, or heterocyclic, comprising mixing the polymer in the molten state with methanol, ethanol, water, or mixtures thereof (hereafter referred to as "the extractant"); removing the extractant; and devolatilizing the molten polymer by application of vacuum. It further relates to the polyglutarimides of improved optical properties prepared by this process. It further relates to a process for reducing the non-aqueous volatile content, especially of residual amines, of the polyglutarimides, the polyglutarimides of reduced volatile content, and blends of such polyglutarimides with other thermoplastics, such as poly(vinyl chloride).

BACKGROUND OF THE INVENTION

Polyglutarimides, that is, polymers containing upwards of 10 weight percent of units of the structure

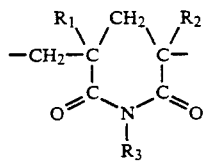

wherein $R_1$ and $R_2$ are separately H or $CH_3$, and $R_3$ is H, $C_1$-$C_{20}$ alkyl, substituted $C_1$-$C_{20}$ alkyl, aryl, substituted aryl, aralkyl, substituted aralkyl, or heterocyclic, have been known for some years as polymers with unique properties, both in the neat form and in blends. Recently commercial activity has begun to produce them on a large scale for many uses as plastics in their own right, as modifiers of performance of plastics such as poly(vinyl chloride), and as components of binary and ternary blends. Although improved optical properties are important in certain combinations with other polymers, such as clear packaging applications of blends with poly(vinyl chloride), a high degree of clarity and avoidance of yellowness is most important for the uses of polyglutarimides as a clear plastic or a component of multi-layered composites.

All of the polyglutarimides described above, and especially those of the above structure where $R_1$, $R_2$, and $R_3$ are methyl, exhibit a combination of high service temperature, high modulus, weatherability, clarity, barrier properties, and an ability to accept impact modification that offers commercial opportunities in such fields as automobile components, such as light housing, sun roofs, glazing, and the like, in electronics uses, such as optical disks and optical fibers, medical devices, business equipment, building/construction, in glazing, as molded articles, as monolithic bottles, and in multi-layer composites.

The polyglutarimides are also useful in binary and ternary blends with many thermoplastics, and as additives for certain thermoplastics, especially poly(vinyl chloride) (PVC). Blends with PVC exhibit an improved service temperature and are useful in siding, equipment housing, hot-fill packaging, and the like.

The preferred manufacturing process, which is direct, requires no solvents, produces a polymer of good thermal stability, can be adapted to a continuous process, and has advantages over the several other techniques known to the art, is based on U.S. Pat. No. 4,246,374 ('374), incorporated herein by reference, wherein a polymer with a high concentration of ester groups, such as from a (meth)acrylate polymer, and especially from a polymer of methyl methacrylate, is contacted with ammonia or a primary amine in the molten state in an extruder, and the methanol, primary amine, and by-product secondary and tertiary amines removed by vacuum devolatilization.

Other processes for the preparation of polyglutarimides, such as treatment of a methacrylic ester or methacrylic acid polymer in solution or suspension with a primary amine, may also be utilized to produce a polyglutarimide whose properties may also be improved by the extractant process of the present invention.

Polyglutarimides prepared by the '374 process or other processes may be further treated by the method of U.S. Pat. No. 4,727,117 ('117), also incorporated herein by reference, wherein the content of acid and anhydride groups in the polyglutarimide are substantially reduced by reaction with an alkylating or esterifying agent. Particularly efficient in this respect are alkyl orthoesters, such as tetramethyl orthocarbonate, trimethyl orthoformate, dimethyl carbonate, and the like.

Polymers from both the '374 and '117 technology may occasionally exhibit an undesirable yellow color. Such color may be overcome by toners, which however lower the optical transmission of the processed piece. There has existed a need for a process to improve the color and other optical properties of the product without doing harm to any of the properties of the polyglutarimide, and which could easily and cheaply be applied to the manufacture of the polyglutarimide of improved color.

Further, polyglutarimides which are useful in food-packaging applications, such as in monolithic bottles, multi-layer film and bottles, or in blends with PVC for hot-fill applications, need to exhibit a low level of non-aqueous volatiles and of food-simulant extractables. The former refers to volatiles other than water detected in the polymer prior to or after processing into the final object which are detected by analysis of the volatiles above the polymer, such as by head-space analysis of the pellets in a closed container or of the contents of an empty bottle; in the present context, major contributors are the mixtures of amines utilized or formed during the imidization process. The latter refers to materials extracted from a formed object, such as a monolithic bottle or a PVC/polyglutarimide bottle, by food simulants such as water, ethanol-water mixtures, acetic acid-water mixtures, heptane, and the like.

Further, it is of importance to remove from an additive polymer, such as an additive polymer for PVC, materials which may react with components of the PVC or with chemicals used to stabilize and process PVC. For example, in certain formulations of PVC containing organometallic stabilizers, the blend of the stabilized PVC with a glutarimide additive will exhibit poorer heat stability than the same PVC without the glutarimide additive. To overcome the problem, higher levels of stabilizers may be used, adding to raw material cost, or milder processing conditions may be used, adding to processing cost. A means to improve the thermal stability of glutarimide additives in PVC without additional cost would be desirable.

The art is silent on means to produce very low levels of non-aqueous volatiles in polyglutarimides, such as poly(N-dimethyl dimethylglutarimide), and is silent as to description of such improved polyglutarimides themselves. Experience with processing such polyglutarimides has led to a desirable target of reduction of volatiles (as measured by trimethylamine analysis) to below 30 ppm, more preferably to 3 ppm or below, and most preferably to 0 ppm, that is, undetectable by GLC (gas-liquid chromatography) analysis. Levels to below 30 ppm can be obtained by slow extrusion (long residence time) and careful application of vacuum devolatilization, especially by using a second exposure ("re-pass") of the polyglutarimide, but the process is less economical and can lead to some thermal degradation of the polyglutarimide.

Further, for processing of additives such as processing aids, impact modifiers and heat distortion improvers, such as polyglutarimides, with PVC, it is desirable to decrease food-simulant extractables so as to achieve acceptable organoleptic properties for materials packaged in such processed PVC. Further, processing of PVC with such additives, almost always conducted in the presence of one or more thermal stabilizers for PVC, is improved by removal of impurities in the additives which can affect the thermal stability of the blend. For polyglutarimides, it has been discovered, as disclosed in U.S. application Ser. No. 07/638,585, now abandoned filed on the same day as the present invention and with a common assignee, that lowering the volatile content, as measured by lowering of residual amine, has a positive effect on stability in PVC blends. The volatiles affecting stability may be residual monomethylamine, dimethylamine or trimethylamine formed as by-products of the imide formation, or other volatile materials formed during the imidization process. A decrease below 30 ppm of such residual amines is desirable to improve thermal stability.

There has thus been sought a practical solution to improving both the food-simulant and thermal stability aspects of PVC//polyglutarimide blends at little additional expense to the cost of the blend.

SUMMARY OF THE INVENTION

We have found that polyglutarimides of improved color can be formed by mixing the polyglutarimide in molten form with water, methanol, ethanol, or a mixture of these materials, stirring or shearing the mixture to cause intimate mixing, the extractants being in the liquid state, and then removing the extractants, devolatilizing under vacuum, and isolating the polymer in solid form. The polymer so formed, when compared to unextracted polyglutarimides of otherwise similar processing history, also has a reduced level of non-aqueous volatile components, will have equivalent or superior performance in the response to extraction with food-simulants, and is more thermally stable in PVC blends.

DETAILED DESCRIPTION OF THE INVENTION

The polyglutarimide to be mixed with the extractant is defined as a polymer having at least 30 weight-percent of units with the dimethylglutarimide cyclic structure noted above. Preferred is that structure where $R_1$ and $R_2$ are both methyl groups and where $R_3$ is hydrogen, lower ($C_1$ to $C_4$ alkyl), or cyclohexyl. Especially preferred is the structure where $R_3$ is methyl, as that unit, N-methyldimethylglutarimide, yields glutarimides of a commercially desirable balance of high service temperature, good barrier properties, weathering, and the like.

Other units may be present in the polyglutarimide structure, such as those derived from esters of (meth)acrylic acid, or from vinyl aromatic monomers such as styrene and the like; lists of such copolymerizable monomers are found in the incorporated references. Especially preferred are units derived from methyl methacrylate. Units derived from (meth)acrylic acid and/or (meth)acrylic anhydride, which are formed during the imidization process, may be present in the polymer to be extracted. For certain uses, such as a modifier for PVC, it is preferred these functionalities be removed prior to extraction, by methods such as taught in '117.

The molecular weight of the polyglutarimide is not critical to the extraction process, although it is preferred for most end uses of the polyglutarimide that the molecular weight be between about 50,000 and 250,000 (weight-average).

The mixing of the polymer with the extractant in the molten state (which is also referred to as "washing" of the polymer melt with the extractant) may be accomplished in any of a variety of processing devices, such as autoclaves, wiped film stills, and the like, but an extruder, especially a devolatilizing extruder, is preferred. Use of other diluents or solvents are not necessary and add to the cost of processing; indeed, the use of toluene as a diluent/wash was ineffective in reducing color.

The extruder may be a single-screw or twin-screw device of various configurations, and may be equipped with mixing devices, such as baffles or static mixers, to assure better mixing. The temperature of mixing is preferably between 200° and 400° C., and especially preferred is from 260° to 300° C. The temperature of the extractant may be from about room temperature to about 205° C.; it is preferred to introduce the extractant with a pressure pump at temperatures about 205° C. for methanol or ethanol, and at about room temperature for water.

Mixing times may be from less than 1 second to above 1 minute, depending on the size of the washing or mixing zone, and the rate at which the imide is passed through the extruder. Pressures developed will normally range from about 3400 to about 5500 kPa, but wider ranges can be employed.

It should be stressed that the present invention differs from processes known to the art where vapors of low-boiling liquids, such as water, are introduced near or at vents for vacuum devolatilization to aid in removal of low-molecular weight volatiles for molten polymers, such as polyolefins. Although any residual water or alcohol removed at the devolatilization zone will aid in removal of other volatiles, such as amines, the water or alcohol added in the mixing step aids in color improvement by removal of colored or color-forming impurities in a liquid wash step.

The invention encompasses several means of processing to obtain the polyglutarimide prior to mixing with the extractant. The polyglutarimide may be prepared separately by any of many methods known to the literature, such as in solution or in a heterogeneous mixture with aqueous amine, isolated, and cooled; the separate preparation may optionally include an acid/anhydride removal process, and will preferably involve a devolatilization step. The cooled polymer is then heated from the solid state to the molten state prior to mixing with the methanol, ethanol, water, or mixtures thereof.

A preferred process to minimize thermal contact will cause the glutarimide units to be formed in the molten polymer immediately prior to the mixing with the methanol, ethanol, water, or mixtures thereof. The imidized polymer can be formed by any of several known methods, taken into the molten step for removal of reactants, and then mixed with the extractant. Preferably the imidization is conducted in one zone or a reactor and the polymer then passed into an adjoining zone for mixing with the extractant. Even more preferred is the method where the imidization polymer is devolatilized to remove solvent, reactants, by-products, and the like, and then immediately mixed with the extractant. Removal of much of the amine content lowers the possibility for catalysis of hydrolysis of the ester or anhydride groups to introduce a higher acid content.

As noted, many uses of the polyglutarimides require removal of the acid and anhydride groups present prior to processing into useful objects or combination into blends. The process of '117 is most useful in this respect. It is preferred that the polyglutarimide be formed in one zone of the extruder, passed to a separate zone for addition of the acid-reductant agent, and then mixed with the extractant in a third zone. It is especially preferred to conduct a vacuum devolatilization on the acid-reduced polyglutarimide after the acid-reduction step but prior to the mixing with the extractant.

When the residual amine content is lowered to below about 100 ppm, preferably below 50 ppm, the polymer may be mixed with a low level of a reducing agent further to improve the color. Preferred is hypophosphorous acid at from about 0.05 to about 2 weight percent (based on the total extractant used) wherein an improvement in color is seen over a similar polymer processed in a similar manner but without the hypophosphorous acid. If the hypophosphorous acid is added when the amine content is greatly above about 100 ppm, corrosion of the metal may occur to cause haze in the isolated polymer. It is preferred to add the hypophosphorous acid in the wash step, admixed with the methanol, ethanol, water, or mixtures thereof. Levels higher than 2% of hypophosphorous acid may be used, but will add to the cost.

The extractant procedure may also be used as a means for delivery of other additives, which normally are admixed into the melt after completion of all washing and devolatilization steps. For example, if it is desired to introduce a phosphite stabilizer, such as tris(nonylphenyl) phosphite, into the glutarimide polymer, the phosphite may be dissolved or suspended in the extractant and mixed with the polyglutarimide. By adding stabilizer in this means, protection against thermal instability is introduced to the polyglutarimide during a period where the molten polymer is exposed to heat.

The extractant is separated and removed through a vent near the die end of the extruder. The liquids may be recovered, distilled or otherwise purified, and re-used in the extractant step. The extractant may be removed as a liquid, or may be distilled from the reactor and condensed.

The extracted polyglutarimide while still in the molten state and after removal of the extractant is exposed to a last vacuum devolatilization to remove the final traces of water, ethanol, or methanol and any last volatile materials not removed with the extractant. This devolatilization is conducted under a vacuum of at least 580 mm. of mercury, at a vent located between the washing zone and the additive port.

The polyglutarimide may then be compounded while still in the molten form with stabilizers, pigments, ultraviolet stabilizers, dyes, fillers, impact modifiers, and the like prior to extrusion into pellets or a shaped object; for some uses, the polymer may be extruded directly without any further additives.

For most efficient removal of residual amines, the extruder may be configured so as to have two or more vacuum devolatilization zones, one prior to the extractant wash step, and one following the removal of the extractant. It is desirable to monitor the volatiles from the collected polymer and adjust the devolatilization conditions to achieve a non-aqueous volatiles analysis (or analysis for content of a major volatile component, such as trimethylamine) below 30 ppm, more especially below 3 ppm, and most especially at 0 ppm.

The polyglutarimide may be re-converted to the molten state from solid form, such as pellets, sheet, or re-grind, or the extractant step may be carried out at the end of the processing extruder used to prepare the polyglutarimide or to carry out the acid-reducing reaction.

The polyglutarimide of reduced color may be directly processed into useful articles; however, it is more common to isolate the extracted polyglutarimide as strands which are chopped into pellets. These pellets may be then used for many purposes in blends, formation of sheet, film, or molded objects.

After extraction is completed, the molten polymer may be treated with conventional additives, such as dyes, pigments, UV absorbers, thermal stabilizers, and the like. Especially useful in this respect for use in weatherable clear applications are ultraviolet stabilizers such as hindered amine light stabilizers (HALS), benzotriazoles, and the like. Improved color on processing of benzotriazole-stabilized polyglutarimides with sharply reduced levels of residual amines is often observed. It may also be blended with other polymers directly, and/or combined with fibers, such as glass or carbon fibers, or fillers prior to isolation as pellets.

The advantages of the polymer of lower yellowness index and other improved optical properties will be seen in such uses as optical fibers, lenses, glazing, lighting fixtures, monolithic bottles, multi-layered bottles with layers of other clear plastics such as polyester or polycarbonate, and the like.

The polyglutarimide may be blended with PVC homo-or copolymers as fully described in U.S. Pat. Nos. 4,255,322, 4,650,824, and 4,727,117, all incorporated by reference. It is preferred for best compatibility with PVC that the blend be a blend of from about 5 to about 95 parts of poly(vinyl chloride) with from about 5 to about 95 parts, preferably from about 5 to about 40 parts (per 100 parts of the PVC), of a polymer containing at least about 30 weight percent of glutarimide units having the structure

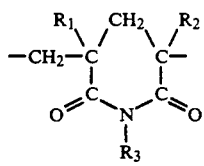

wherein $R_1$ and $R_2$ are separately H or $CH_3$, and $R_3$ is H, $C_1$–$C_4$ alkyl or cyclohexyl. It is more preferred that the blend be with a polymer wherein $R_1$, $R_2$, and $R_3$ are $CH_3$, and prepared by the process described above where the acid/anhydride content is reduced. It is further preferred that the acid-reduced polyglutarimide be devolatilized prior to mixing with the extractant.

PVC, usually as a homopolymer of vinyl chloride, but also as a copolymer with, e.g., vinylidene chloride, ethylene, vinyl acetate, and the like, or as a graft copolymer of vinyl chloride onto a pre-formed rubbery polymer, such as a polyolefin or a poly(acrylate), may be blended with the extracted polyglutarimide at use levels preferably of about 5 to about 30 parts of polyglutarimide per 100 parts of PVC resin, although both higher or lower amounts may be useful to fulfill certain property requirements. The blends may contain any of several well-known stabilizers for PVC, such as organotin stabilizers, calcium-zinc stabilizers, organolead stabilizers, barium-cadmium stabilizers, and the like.

The improved thermal stability of the glutarimide of the present process in PVC and the lowered non-aqueous volatiles content and food-simulant extractants can be utilized in the manufacture of PVC bottles and containers, especially for hot-fill, such as for ketchup, jellies, syrups, and the like; in siding for buildings, window profiles, and the like; in housings for electrical components; and in many other uses requiring the flame resistance and toughness of PVC and the added heat distortion resistance imparted by the polyglutarimide.

EXAMPLES

EXAMPLES 1-5

These examples illustrate the improvement in optical properties obtained when a glutarimide polymer is prepared and directly mixed with water or methanol.

A polymer containing predominantly (ca. 76 weight %) N-methyldimethylglutarimide units having a nitrogen content of 6.0%, a glass temperature of ca. 150° C., and with a total of ca. 5% acid and anhydride groups, was prepared in a 50.8 mm. Welding Engineers twin-screw extruder equipped with zones for admixture of methylamine and for devolatilization of excess amine and reaction by-products. The poly(methyl methacrylate) feed was supplied at 70 grams/minute, and monomethylamine was fed at a rate of 38 cc/minute at 5.51 mPa pressure at 280°-300° C.

The imidized polymer melt was then passed into a zone equipped with a means for pumping in (and for removing) the water or methanol extractant. The extractant was supplied from a source at room temperature at a rate of 14 cc./minute. A pressure of ca. 3.8 mPa was obtained. Mixing with the extractant was conducted in the reaction zone normally used for contact with the acid/anhydride reductant, where that process variant is applied. The polymer was then led through a devolatilization zone, into a die, and stranded and chopped into pellets.

The pellets were molded into test bars for determination of optical properties by test method ASTM D-1925. All data are the mean of five optical determinations.

| Example | Extractant | TWLT | YI |
|---|---|---|---|
| 1 | none (control) | 90.47 | 3.39 |
| 2 | Methanol | 90.59 | 3.02 |
| 3 | Methanol:water (1:1) | 90.74 | 3.02 |
| 4 | Water | 90.81 | 2.16 |
| 5 | Methanol | 91.12 | 1.63 |

TWLT: total white light transmission; YI: yellowness index.

EXAMPLES 6-12

This example illustrates the positive effects of water or methanol extracting or washing on an imide sample which has been re-worked. A polymer similar to that described in Examples 1-5 was imidized, devolatilized and extruded, but no extractant was applied. The pellets were then re-fed to the extruder under similar conditions (50 grams/minute) except that no amine was added to the imidization reaction zone, and then extracted with water or methanol fed at a rate of 11 cc/minute at a pressure of 3.65 mPa. The extracted material was devolatilized, pelletized and molded. Mixing with the extractant was conducted in in the reaction zone normally used for contact with the acid/anhydride reductant, where that process variant is applied.

| Example | Extractant | TWLT | YI | |
|---|---|---|---|---|
| 6 | none (control) | 90.0 | 5.8 | |
| 7 | Methanol | 90.1 | 5.2 | |
| 8 | none (control) | 89.7 | 6.1 | |
| 9 | Methanol:water (1:1) | 90.6 | 3.9 | |
| 10 | none (control) | 89.9 | 5.8 | |
| 11 | Water | 90.6 | 3.1 | |
| 12 | none (control) | 89.8 | 6.3 | (re-measured next day) |

EXAMPLES 13-15

These examples illustrate the improvement in optical properties in a polyglutarimide which has been treated previously to reduce the content of acid and anhydride groups in the polymer.

A polymer of MW ca. 110,000 and imide nitrogen content 4.79%, corresponding to ca. 45% imide content, was prepared with no extracting step and with no additives. The acid and anhydride content were reduced to low levels by contact with dimethyl carbonate. It was then re-processed in a 5.1 cm. extruder equipped with means for washing, venting, and a final devolatilization. In the re-processing step, the polymer was fed at a rate of 59 kg./hour, the melt was at 246° C., methanol was fed at 4.6 kg./hour, and water at 7.3 kg./hour. The first zone of the extruder, normally used for imidization was capped; the second zone, normally used for acid-reduction, was at 260° C. and 1.7 mPa pressure.

Samples were analyzed for color and residual TMA content. The values given are the average for separate determinations of several portions of re-processed polyglutarimide. The extractant process lowers the trimethylamine content to where no peak is seen on the GLC analysis. As it is preferred to avoid two separate heating steps, the extracting process may be applied to a similar polymer directly (i.e., without cooling and isolating) after it is imidized, acid-reduced, and devolatilized.

| Example | Treatment | TMA | MeOH | TWLT | YI |
|---|---|---|---|---|---|
| 13 | None (contol; double-passed) | 9 | 39 | 90.4 | 2.4 |
| 14 | Methanol | 0 | 26 | 90.5 | 2.0 |
| 15 | Water | 0 | 3 | 90.8 | 1.75 |

EXAMPLE 16

This example demonstrates the improved thermal stability in PVC when the water-extracted polymer of Example 15 is compared with a similar polymer which was not water-extracted (and also did not have an additional heat history of melting and cooling).

The polymer and the control are ground to a powder, and admixed with PVC and other additives in a "masterbatch" formulation. Three different types of stabilizers were studied. Evaluation is performed by heating the masterbatch plus polyglutarimide on a two-roll mill, the front roll operating at 26 rpm and the rear at 20 rpm, at 205° C. After fusion occurs, samples are removed every three minutes and cut or pressed into 25.4 by 25.4 by 3.15 mm. pieces, which are then ranked for color. The time to black for an "unmodified control" with no glutarimide polymer is noted, and the time to black for the various extracted polymers. Although the water-extracted glutarimide polymer is less stable than the "unmodified control," it exhibits a significant advantage in stability over the sample which was not water-extracted. The extractant treatment is less reproducible in calcium-zinc formulations, or in tin formulations based on K=50 PVC, although in most experiments an improvement in heat stability is seen for the extracted polyglutarimide.

| Polymer | Example 2 | Control (not re-extruded) |
|---|---|---|
| trimethylamine, ppm | 0 | 56 |
| methanol, ppm | 0 | 70 |
| dimethyl carbonate, ppm | — | 300,200 |
| Tin stabilized formulation: | PHR (parts per hundred resin) | |
| PVC, K 60 | 100 | |
| Glutarimide polymer | 25 | |
| Octyl tin stabilizer | 1.5 | |
| Glycerol monostearate | 0.6 | |
| Waxes | 0.3 | |
| Acrylic processing aid | 1.0 | |
| MBS impact modifier | 8 | |
| Time to char, min. | | |
| no glutarimide | | 15 |
| Unextracted | | 12 |
| Example 15 | | 15 |
| Lead stabilized formulation: | PHR | |
| PVC, K 50 | 100 | |
| Glutarimide polymer | 25 | |
| Lead stearate stabilizer | 4.7 | |
| Lubricants | 0.8 | |
| Acrylic processing aid | 1.5 | |
| Titanium dioxide | 4 | |
| Acrylic impact modifier | 10 | |
| Time to char, min. | | |
| no glutarimide | | 54 |
| Unextracted | | 36 |
| Example 15 | | 51 |

EXAMPLE 17

If the process described in Example 5 is repeated with methanol replaced by ethanol, similar results will be obtained as pertains to thermal stability and reduction of volatiles.

EXAMPLES 18-20

This example illustrates the effect of hypophosphorous acid in improving color. In a separate experiment similar to that of Examples 6-12, the poly(glutarimide) was treated with no extractant, with methanol, and with methanol containing 1% hypophosphorous acid. The yellowness index values were:

| | YI |
|---|---|
| Example 18 (re-passed, no extractant) | 7.79 |
| Example 19 (methanol) | 6.84 |
| Example 20 (methanol, 1% $H_3PO_2$) | 3.35 |

We claim:

1. A process for improving the optical properties and lowering the content of residual amines of polymers containing at least about 30 weight percent of glutarimide units having the structure

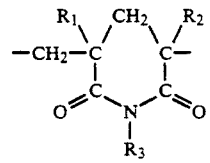

wherein $R_1$ and $R_2$ are separately H or $CH_3$, and $R_3$ is H, $C_1$-$C_{20}$ alkyl, substituted $C_1$-$C_{20}$ alkyl, cycloalkyl, aryl, substituted aryl, aralkyl, substituted aralkyl, or heterocyclic, comprising a) mixing the polymer in the molten state with methanol, ethanol, water, or mixtures thereof in their liquid state;

b) removing the methanol, ethanol, water, or mixtures thereof in their liquid state; and c) devolatilizing the molten polymer by application of vacuum.

2. The process of claim 1 wherein $R_1$, $R_2$, and $R_3$ are $CH_3$.

3. The process of claim 1 wherein the polymer further contains units derived from methyl methacrylate.

4. The process of claim 3 wherein the polymer further contains units derived from at least one of methacrylic acid or methacrylic anhydride.

5. The process of claim 1 wherein the mixing is conducted in a devolatilizing extruder.

6. The process of claim 1 wherein the glutarimide units are formed in the molten polymer, the molten polymer containing glutarimide units is contacted with an alkylating or esterifying agent, and the alkylated or esterified molten polymer containing glutarimide units is devolatilized by application of vacuum immediately prior to mixing with the methanol.

7. The process of claim 6, wherein $R_1$, $R_2$, and $R_3$ are $CH_3$, and wherein the polymer further contains units derived from methyl methacrylate.

8. The process of claim 6, wherein the polymer is mixed with from about 0.05 to about 2 weight percent of hypophosphorous acid admixed with the methanol, ethanol, water, or mixture thereof.

* * * * *